US012781007B2

(12) United States Patent
Oobuchi et al.

(10) Patent No.: US 12,781,007 B2
(45) Date of Patent: Nov. 3, 2026

(54) ELECTROMAGNETIC WAVE TRANSMISSIVE LAMINATE

(71) Applicant: TOYODA GOSEI CO., LTD., Kiyosu (JP)

(72) Inventors: Yuunosuke Oobuchi, Kiyosu (JP); Shunsuke Aoyama, Kiyosu (JP); Koji Okumura, Kiyosu (JP); Takeshi Sugiyama, Nara-city (JP)

(73) Assignee: TOYODA GOSEI CO., LTD., Aichi-pref (JP)

( * ) Notice: Subject to any disclaimer, the term of this patent is extended or adjusted under 35 U.S.C. 154(b) by 31 days.

(21) Appl. No.: 19/040,018

(22) Filed: Jan. 29, 2025

(65) Prior Publication Data

US 2025/0289936 A1 Sep. 18, 2025

(30) Foreign Application Priority Data

Mar. 18, 2024 (JP) ................................ 2024-042429

(51) Int. Cl.
*C08J 7/04* (2020.01)
*G01S 7/02* (2006.01)

(52) U.S. Cl.
CPC ............... *C08J 7/042* (2013.01); *G01S 7/027* (2021.05)

(58) Field of Classification Search
None
See application file for complete search history.

(56) References Cited

U.S. PATENT DOCUMENTS

2005/0031897 A1 2/2005 Kamiya et al.
2022/0013885 A1 1/2022 Yang et al.
2022/0276377 A1* 9/2022 Sasaki ................ H01Q 15/0026

FOREIGN PATENT DOCUMENTS

JP 4158646 B2 10/2008
JP 2020-106384 A 7/2020
WO WO-2023240030 A1 * 12/2023 ........... H01Q 1/3233

OTHER PUBLICATIONS

T474 data sheet from PPG Industries (Year: 2026).*

* cited by examiner

*Primary Examiner* — Ramsey Zacharia
(74) *Attorney, Agent, or Firm* — Posz Law Group, PLC

(57) ABSTRACT

A laminate has an electromagnetic wave transmissivity. The laminate includes a substrate made of a synthetic resin and a colored layer laminated on the substrate. The relative permittivity of the colored layer is in a range of 3.1 to 66.7. The effective permittivity of the laminate is greater than the relative permittivity of the substrate and 3.0 or less.

5 Claims, 1 Drawing Sheet

ELECTROMAGNETIC WAVE TRANSMISSIVE LAMINATE

CROSS-REFERENCE TO RELATED APPLICATIONS

This application is based upon and claims the benefit of priority from Japanese Patent Application No. 2024-042429, filed on Mar. 18, 2024, the entire contents of which are incorporated herein by reference.

BACKGROUND

1. Field

The present disclosure relates to an electromagnetic wave transmissive laminate.

2. Description of Related Art

Japanese Patent No. 4158646 discloses an automobile front grille (hereinafter, referred to as a front grille) provided in a beam path of a radar device. The front grille disclosed in this document includes a base made of synthetic resin, a titanium nitride layer covering the outer surface of the base, and an aluminum nitride layer covering the titanium nitride layer. The front grille has millimeter wave transmissivity. The relative permittivities of the titanium nitride layer and the aluminum nitride layer are set to be substantially the same as that of the base. The relative permittivity of the base made of synthetic resin is less than or equal to 3.0.

Pigmented paints used for automobile components contain metallic fillers. The relative permittivity of a coating film containing metallic fillers exceeds 3.0. Therefore, it is considered challenging to ensure electromagnetic wave transmissivity in a front grille with a coating film that contains metallic fillers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electromagnetic wave transmissive laminate having electromagnetic wave transmissivity includes a substrate made of a synthetic resin and a colored layer laminated on the substrate. A relative permittivity of the colored layer is in a range of 3.1 to 66.7. An effective permittivity of the laminate is greater than a relative permittivity of the substrate and 3.0 or less.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A laminate 10 according to an embodiment will now be described with reference to FIGS. 1 and 2. The laminate 10 is used as an exterior component of a vehicle.

In the following description, a front side and a rear side in a front-rear direction of a vehicle are simply referred to as a front side and a rear side, respectively.

Figure 1:
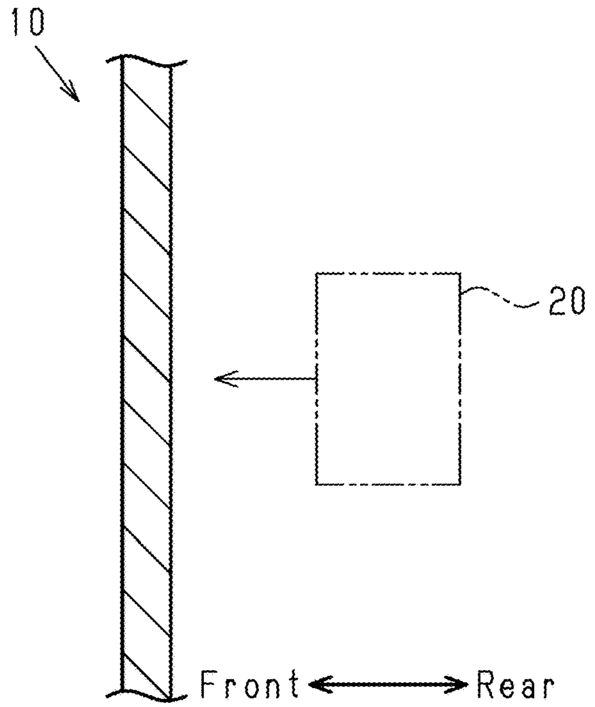
FIG. 1 is a cross-sectional view showing a positional relationship between a laminate according to an embodiment and a millimeter wave radar device.

As indicated by the long-dash double-short-dash line in FIG. 1, the vehicle is equipped with a known millimeter wave radar device 20. The millimeter wave radar device 20 is provided in a front portion of the vehicle and emits millimeter waves forward.

The laminate 10, which is an exterior component covering the millimeter wave radar device 20, is disposed in front of the millimeter wave radar device 20. The laminate 10 is, for example, a grille cover that forms a front portion of the vehicle exterior body. The laminate 10 has millimeter wave transmissivity.

Next, the layer structure of the laminate 10 will be described.

Figure 2:
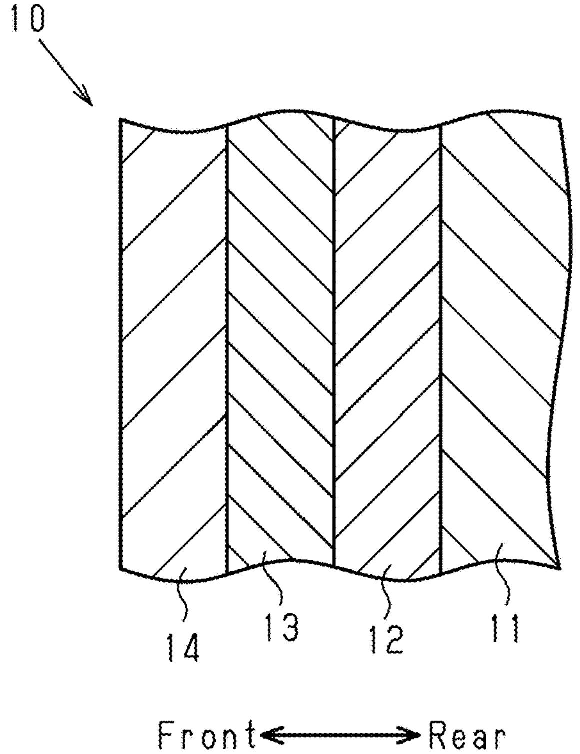
FIG. 2 is a cross-sectional view showing a layer structure of the laminate shown in FIG. 1.

As shown in FIG. 2, the laminate 10 includes, in order from the rear side, a substrate 11, a primer layer 12, a colored layer 13, and a protective layer 14.

The substrate 11 is made of a synthetic resin and has millimeter wave transmissivity. Examples of the resin material forming the substrate 11 include, for example, thermoplastic resins such as polypropylene (PP), polyvinyl chloride (PVC), polymethyl methacrylate resin (PMMA), acrylonitrile-butadiene-styrene copolymer (ABS) resin, acrylonitrile-ethylene-propylene-diene-styrene (AES) resin, acrylonitrile-styrene-acrylate copolymer (ASA) resin, and polycarbonate (PC). The substrate 11 of the present embodiment is made of polycarbonate.

The primer layer 12 enhances the adhesion of the colored layer 13 to the substrate 11, and is laminated on the substrate 11. The primer layer 12 is made of a synthetic resin and has millimeter wave transmissivity. The primer layer 12 is formed of a known resin primer paint.

The relative permittivity of the primer layer 12 is preferably in a range of 3.1 to 66.

The colored layer 13 is designed to provide the appearance color of the laminate 10 and is laminated on the primer layer 12. The colored layer 13 is made of a synthetic resin and has a millimeter wave transmissivity. The colored layer 13 is formed by applying a paint containing a base resin and fillers to the front surface of the primer layer 12. Examples of the application method include known application methods such as a spray coating method, a dipping method, a shower coating method, a flow coating method, and a roll coating method.

Examples of the material for the base resin include resin materials contained in a known resin paint, such as an acrylic resin-based paint, a urethane resin-based paint, a polyester resin-based paint, an epoxy resin-based paint, a melamine resin-based paint, an alkyd resin-based paint, or a phenol resin-based paint.

The materials for the fillers may have higher relative permittivities than that of the base resin. Examples of the fillers include: sparkle materials such as mica particles, pearl mica particles, and glass flakes; metallic conductive filler particles such as aluminum flakes; metal oxide-based conductive filler particles such as zinc oxide flakes; and metal-coated conductive filler particles obtained by coating the surfaces of mica or glass flakes with a metal such as aluminum or nickel.

The relative permittivity of the colored layer 13 is in a range of 3.1 to 66.7. The relative permittivity of the colored layer 13 is preferably greater than or equal to 3.5. The relative permittivity of the colored layer 13 is more preferably greater than or equal to 4.0.

The protective layer 14 imparts durability to the laminate 10, and is laminated on the colored layer 13. The protective layer 14 is made of a synthetic resin and has a millimeter wave transmissivity. The protective layer 14 is a so-called clear coat and is formed of a known resin paint for clear coat.

The effective permittivity of the laminate 10 is greater than the relative permittivity of the substrate 11 and is less than or equal to 3.0. The relative permittivity of the substrate 11 of the present embodiment is 2.67.

From the viewpoint of increasing the millimeter wave transmissivity of the laminate 10, it is preferable to reduce the reflection attenuation of the laminate 10.

The primary factor contributing to the increased reflection attenuation of the laminate 10 is understood to be the colored layer 13, which has a high relative permittivity. Accordingly, in conventional approaches, the colored layer 13 has been formed using materials with a relative permittivity comparable to that of the substrate 11, specifically material having a relative permittivity of 3.0 or less. However, in such cases, the range of materials available for forming the colored layer 13 is restricted, resulting in limited flexibility in designing the appearance color of the laminate 10.

The inventors of the present application determined the effective permittivity of the laminate 10 by varying only the relative permittivity of the colored layer 13 among the parameters of the layers constituting the laminate 10, as shown in Table 1. Based on the derived effective permittivity, the reflection attenuation of the laminate 10 was calculated. Furthermore, the inventors identified the range of relative permittivity values for the colored layer 13 that results in a reflection attenuation of laminate 10 being-18 dB or less, which serves as an indicator of a relatively high millimeter wave transmissivity.

The effective permittivity refers to the relative permittivity of the entire laminate 10, taking into consideration its overall thickness. The effective permittivity is determined by a function that incorporates the refractive index, the relative permittivity, and the thickness of each layer, as well as the wavelength of the millimeter waves.

TABLE 1

| | | | | | |
|---|---|---|---|---|---|
| Thickness of Colored Layer [μm] | 30 | 30 | 30 | 30 | 30 |
| Relative Permittivity of Colored Layer | 3.1 | 4.0 | 10.0 | 20.0 | 66.7 |
| Effective Permittivity of Laminate | 2.72 | 2.73 | 2.78 | 2.84 | 3.00 |
| Reflection Attenuation of Laminate [dB] | −18.52 | −18.93 | −21.22 | −25.22 | −27.18 |

In the present embodiment, the parameters of the respective layers of the laminate 10 were set as follows when deriving the effective permittivity and reflection attenuation:

Thickness of substrate 11: 2.2 mm

Relative permittivity of substrate 11: 2.67

Thickness of primer layer 12: 30 μm

Relative permittivity of primer layer 12: 7.0

Thickness of colored layer 13: 30 μm

Thickness of protective layer 14: 30 μm

Relative permittivity of protective layer 14: 3.0

As shown in Table 1, when the relative permittivity of the colored layer 13 was in the range of 3.1 to 66.7, the effective permittivity of the laminate 10 was found to be within the range of 2.72 to 3.00. Additionally, the reflection attenuation of the laminate 10 was found to be within the range of −27.18 dB to −18.52 dB.

Operation of the present embodiment will now be described.

The inventors of the present application have found that when the effective permittivity of the laminate 10 is greater than the relative permittivity of the substrate 11 and does not exceed 3.0, the reflection attenuation of electromagnetic waves in the laminate 10 remains −18 dB or lower, even if the relative permittivity of the colored layer 13 is within the range of 3.1 to 66.7.

The present embodiment has the following advantages.

(1) The laminate 10 exhibits electromagnetic wave transmissivity and includes the substrate 11 made of a synthetic resin and a colored layer 13 laminated on the substrate 11. The relative permittivity of the colored layer 13 is in a range of 3.1 to 66.7. The effective permittivity of the laminate 10 is greater than the relative permittivity of the substrate 11 and is less than or equal to 3.0.

With this configuration, since the operations of the above-described embodiment are achieved, the electromagnetic wave transmissivity of the laminate 10 is enhanced while also increasing the design flexibility of its appearance color.

(2) The primer layer 12 is laminated on the substrate 11. The colored layer 13 is laminated on the primer layer 12.

This configuration, in which the colored layer 13 is laminated on the primer layer 12, which is laminated on the substrate 11, improves the adhesion between the substrate 11 and the colored layer 13.

Modifications

The above-described embodiment may be modified as follows. The above-described embodiment and the following modifications can be combined as long as the combined modifications remain technically consistent with each other.

The colored layer 13 may be free of fillers.

If the adhesion between the substrate 11 and the colored layer 13 can be enhanced, the primer layer 12 may be omitted.

Various changes in form and details may be made to the examples above without departing from the spirit and scope of the claims and their equivalents. The examples are for the sake of description only, and not for purposes of limitation.

Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An electromagnetic wave transmissive laminate having millimeter wave transmissivity and configured to form an exterior component of a vehicle, comprising:

a substrate made of a synthetic resin; and a colored layer laminated on the substrate, wherein a relative permittivity of the colored layer is in a range of 10.0 to 66.7, and an effective permittivity of the laminate is greater than a relative permittivity of the substrate, the effective permittivity being in a range of 2.78 to 3.0.

2. The electromagnetic wave transmissive laminate according to claim 1, wherein a primer layer is laminated on the substrate, the colored layer is laminated on the primer layer, and a protective layer is laminated on the colored layer.

3. The electromagnetic wave transmissive laminate according to claim 1, wherein the relative permittivity of the colored layer is in a range of 10.0 to 20.0.

4. The electromagnetic wave transmissive laminate according to claim 1, wherein the colored layer is formed from a paint containing a base resin and fillers, the fillers include at least one of sparkle materials, metallic conductive filler particles, metal oxide-based conductive filler particles, and metal-coated conductive filler particles, and the sparkle materials include at least one of mica particles, pearl mica particles, and glass flakes.

5. The electromagnetic wave transmissive laminate according to claim 1, wherein the laminate exhibits a reflection attenuation of −21 dB or less at a millimeter-wave frequency.

* * * * *